(12) United States Patent
Cho et al.

(10) Patent No.: US 8,737,332 B2
(45) Date of Patent: May 27, 2014

(54) METHOD OF TRANSMITTING AND RECEIVING AN ACKNOWLEDGEMENT IN A WIRELESS SYSTEM

(75) Inventors: Hee Jeong Cho, Anyang-si (KR); Ki Seon Ryu, Anyang-si (KR); Young Soo Yuk, Anyang-si (KR); In Uk Jung, Anyang-si (KR); Jin Sam Kwak, Anyang-si (KR); Eun Jong Lee, Anyang-si (KR); Su Nam Kim, Anyang-si (KR); Yong Ho Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 13/265,846

(22) PCT Filed: Apr. 14, 2010

(86) PCT No.: PCT/KR2010/002296
§ 371 (c)(1),
(2), (4) Date: Oct. 21, 2011

(87) PCT Pub. No.: WO2010/123218
PCT Pub. Date: Oct. 28, 2010

(65) Prior Publication Data
US 2012/0044895 A1 Feb. 23, 2012

Related U.S. Application Data

(60) Provisional application No. 61/171,469, filed on Apr. 22, 2009, provisional application No. 61/172,790, filed on Apr. 27, 2009, provisional application No. 61/173,155, filed on Apr. 27, 2009, provisional application No. 61/173,217, filed on Apr. 28, 2009, provisional application No. 61/175,060, filed on May 4, 2009.

(30) Foreign Application Priority Data

Jul. 24, 2009 (KR) .................. 10-2009-0067775

(51) Int. Cl.
*H04W 4/00* (2009.01)
*H04W 72/04* (2009.01)
*H04L 5/00* (2006.01)

(52) U.S. Cl.
CPC ........ *H04W 72/0406* (2013.01); *H04W 72/042* (2013.01); *H04L 5/0055* (2013.01)
USPC ............................................. 370/329; 370/389

(58) Field of Classification Search
None
See application file for complete search history.

(56) References Cited

U.S. PATENT DOCUMENTS

| | | | |
|---|---|---|---|
| 2006/0203712 A1 | 9/2006 | Lim et al. | |
| 2007/0274265 A1 | 11/2007 | Yoon et al. | |
| 2009/0094498 A1* | 4/2009 | Kim et al. | 714/750 |
| 2010/0165920 A1* | 7/2010 | Chen | 370/328 |

FOREIGN PATENT DOCUMENTS

KR 1020050044219 5/2005

OTHER PUBLICATIONS

Marks et al. (Part 16: Air Interface for Fixed and Mobile Broadband Wireless Access Systems; Advanced Air Interface—working document; 802.16m-09/0010r1a (working document) Mar. 2008; Mar. 31, 2009.*

* cited by examiner

*Primary Examiner* — Yemane Mesfin
*Assistant Examiner* — Christine Duong
(74) *Attorney, Agent, or Firm* — Lee, Hong, Degerman, Kang & Waimey

(57) ABSTRACT

A method for transmitting and receiving an ACKnowledgment (ACK) in a wireless communication system is disclosed. The method includes transmitting a bandwidth request indicator to a Base Station (BS); and receiving an ACK for the transmitted bandwidth request indicator from the BS, the ACK including an extended A-MAP Type field, wherein the extended A-MAP Type field indicates a format of the ACK.

10 Claims, 20 Drawing Sheets

| field name | bit |
|---|---|
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Contents total bit | 25 |
| A-MAP type | 4 |
| MCRC (opportunity index) | 16 |
| A-MAP total bit | 45 |

(a)

| field name | bit |
|---|---|
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Received code index 5 | 5 |
| MSG decoding indicator 5 | 1 |
| Contents total bit | 31 |
| A-MAP type | 4 |
| MCRC (opportunity index) | 16 |
| A-MAP total bit | 51 |

(b)

| field name | bit |
|---|---|
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Received code index 5 | 5 |
| MSG decoding indicator 5 | 1 |
| Received code index 6 | 5 |
| MSG decoding indicator 6 | 1 |
| Contents total bit | 37 |
| A-MAP type | 4 |
| MCRC (opportunity index) | 16 |
| MSG decoding indicator | 57 |

| field name | bit |
|---|---|
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Contents total bit | 25 |
| A-MAP type | 4 |
| MCRC (opportunity index) | 16 |
| A-MAP total bit | 45 |

(a)

| field name | bit |
|---|---|
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Received code index 5 | 5 |
| MSG decoding indicator 5 | 1 |
| Contents total bit | 31 |
| A-MAP type | 4 |
| MCRC (opportunity index) | 16 |
| A-MAP total bit | 51 |

(b)

| field name | bit |
|---|---|
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Received code index 5 | 5 |
| MSG decoding indicator 5 | 1 |
| Received code index 6 | 5 |
| MSG decoding indicator 6 | 1 |
| Contents total bit | 37 |
| A-MAP type | 4 |
| MCRC (opportunity index) | 16 |
| MSG decoding indicator | 57 |

| field name | bit |
|---|---|
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Received code index 5 | 5 |
| MSG decoding indicator 5 | 1 |
| Received code index 6 | 5 |
| MSG decoding indicator 6 | 1 |
| Received code index 7 | 5 |
| MSG decoding indicator 7 | 1 |
| Received code index 8 | 5 |
| MSG decoding indicator 8 | 1 |
| Received code index 9 | 5 |
| MSG decoding indicator 9 | 1 |
| Received code index 10 | 5 |
| MSG decoding indicator 10 | 1 |
| Received code index 11 | 5 |
| MSG decoding indicator 11 | 1 |
| Received code index 12 | 5 |
| MSG decoding indicator 12 | 1 |
| Contents total bit | 73 |
| | |
| A-MAP type | 4 |
| MCRC (opportunity index) | 16 |
| A-MAP total bit | 93 |

(a)

| field name | bit |
|---|---|
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Received code index 5 | 5 |
| MSG decoding indicator 5 | 1 |
| Received code index 6 | 5 |
| MSG decoding indicator 6 | 1 |
| Received code index 7 | 5 |
| MSG decoding indicator 7 | 1 |
| Received code index 8 | 5 |
| MSG decoding indicator 8 | 1 |
| Received code index 9 | 5 |
| MSG decoding indicator 9 | 1 |
| Received code index 10 | 5 |
| MSG decoding indicator 10 | 1 |
| Received code index 11 | 5 |
| MSG decoding indicator 11 | 1 |
| Received code index 12 | 5 |
| MSG decoding indicator 12 | 1 |
| Received code index 13 | 5 |
| MSG decoding indicator 13 | 1 |
| Contents total bit | 79 |
| | |
| A-MAP type | 4 |
| MCRC (opportunity index) | 16 |
| A-MAP total bit | 99 |

(b)

| field name | bit |
|---|---|
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Received code index 5 | 5 |
| MSG decoding indicator 5 | 1 |
| Received code index 6 | 5 |
| MSG decoding indicator 6 | 1 |
| Received code index 7 | 5 |
| MSG decoding indicator 7 | 1 |
| Received code index 8 | 5 |
| MSG decoding indicator 8 | 1 |
| Received code index 9 | 5 |
| MSG decoding indicator 9 | 1 |
| Received code index 10 | 5 |
| MSG decoding indicator 10 | 1 |
| Received code index 11 | 5 |
| MSG decoding indicator 11 | 1 |
| Received code index 12 | 5 |
| MSG decoding indicator 12 | 1 |
| Received code index 13 | 5 |
| MSG decoding indicator 13 | 1 |
| Received code index 14 | 5 |
| MSG decoding indicator 14 | 1 |
| Contents total bit | 85 |
| | |
| A-MAP type | 4 |
| MCRC (opportunity index) | 16 |
| A-MAP total bit | 105 |

| field name | bit |
|---|---|
| Status indicator | 1 |
| Resource start offset | 7 |
| Received code index 1 | 5 |
| MSG decoding indicator 1 | 1 |
| grant indicator 1 | 1 |
| Received code index 2 | 5 |
| MSG decoding indicator 2 | 1 |
| grant indicator 2 | 1 |
| Received code index 3 | 5 |
| MSG decoding indicator 3 | 1 |
| grant indicator 3 | 1 |
| Contents total bit | 29 |
| A-MAP type | 4 |
| MCRC (opportunity index) | 16 |
| A-MAP total bit | 49 |

(a)

| field name | bit |
|---|---|
| Status indicator | 1 |
| Resource start offset | 7 |
| Received code index 1 | 5 |
| MSG decoding indicator 1 | 1 |
| grant indicator 1 | 1 |
| Received code index 2 | 5 |
| MSG decoding indicator 2 | 1 |
| grant indicator 2 | 1 |
| Received code index 3 | 5 |
| MSG decoding indicator 3 | 1 |
| grant indicator 3 | 1 |
| Received code index 4 | 5 |
| MSG decoding indicator 4 | 1 |
| grant indicator 4 | 1 |
| Contents total bit | 36 |
| A-MAP type | 4 |
| MCRC (opportunity index) | 16 |
| A-MAP total bit | 56 |

(b)

| field name | bit |
|---|---|
| Status indicator | 1 |
| Resource start offset | 7 |
| Received code index 1 | 5 |
| MSG decoding indicator 1 | 1 |
| grant indicator 1 | 1 |
| Received code index 2 | 5 |
| MSG decoding indicator 2 | 1 |
| grant indicator 2 | 1 |
| Received code index 3 | 5 |
| MSG decoding indicator 3 | 1 |
| grant indicator 3 | 1 |
| Received code index 4 | 5 |
| MSG decoding indicator 4 | 1 |
| grant indicator 4 | 1 |
| Received code index 5 | 5 |
| MSG decoding indicator 5 | 1 |
| grant indicator 5 | 1 |
| Contents total bit | 43 |
| A-MAP type | 4 |
| MCRC (opportunity index) | 16 |
| MSG decoding indicator | 63 |

| field name | bit |
|---|---|
| Status indicator | 1 |
| Resource start offset | 7 |
| Received code index 1 | 5 |
| MSG decoding indicator 1 | 1 |
| grant indicator 1 | 1 |
| Received code index 2 | 5 |
| MSG decoding indicator 2 | 1 |
| grant indicator 2 | 1 |
| Received code index 3 | 5 |
| MSG decoding indicator 3 | 1 |
| grant indicator 3 | 1 |
| Received code index 4 | 5 |
| MSG decoding indicator 4 | 1 |
| grant indicator 4 | 1 |
| Received code index 5 | 5 |
| MSG decoding indicator 5 | 1 |
| grant indicator 5 | 1 |
| Received code index 6 | 5 |
| MSG decoding indicator 6 | 1 |
| grant indicator 6 | 1 |
| Received code index 7 | 5 |
| MSG decoding indicator 7 | 1 |
| grant indicator 7 | 1 |
| Received code index 8 | 5 |
| MSG decoding indicator 8 | 1 |
| grant indicator 8 | 1 |
| Received code index 9 | 5 |
| MSG decoding indicator 9 | 1 |
| grant indicator 9 | 1 |
| Contents total bit | 71 |
| | |
| A-MAP type | 4 |
| MCRC (opportunity index) | 16 |
| A-MAP total bit | 91 |

(a)

| field name | bit |
|---|---|
| Status indicator | 1 |
| Resource start offset | 7 |
| Received code index 1 | 5 |
| MSG decoding indicator 1 | 1 |
| grant indicator 1 | 1 |
| Received code index 2 | 5 |
| MSG decoding indicator 2 | 1 |
| grant indicator 2 | 1 |
| Received code index 3 | 5 |
| MSG decoding indicator 3 | 1 |
| grant indicator 3 | 1 |
| Received code index 4 | 5 |
| MSG decoding indicator 4 | 1 |
| grant indicator 4 | 1 |
| Received code index 5 | 5 |
| MSG decoding indicator 5 | 1 |
| grant indicator 5 | 1 |
| Received code index 6 | 5 |
| MSG decoding indicator 6 | 1 |
| grant indicator 6 | 1 |
| Received code index 7 | 5 |
| MSG decoding indicator 7 | 1 |
| grant indicator 7 | 1 |
| Received code index 8 | 5 |
| MSG decoding indicator 8 | 1 |
| grant indicator 8 | 1 |
| Received code index 9 | 5 |
| MSG decoding indicator 9 | 1 |
| grant indicator 9 | 1 |
| Received code index 10 | 5 |
| MSG decoding indicator 10 | 1 |
| grant indicator 10 | 1 |
| Contents total bit | 78 |
| | |
| A-MAP type | 4 |
| CRC (opportunity index) | 16 |
| A-MAP total bit | 98 |

(b)

| field name | bit |
|---|---|
| Status indicator | 1 |
| Resource start offset | 7 |
| Received code index 1 | 5 |
| MSG decoding indicator 1 | 1 |
| grant indicator 1 | 1 |
| Received code index 2 | 5 |
| MSG decoding indicator 2 | 1 |
| grant indicator 2 | 1 |
| Received code index 3 | 5 |
| MSG decoding indicator 3 | 1 |
| grant indicator 3 | 1 |
| Received code index 4 | 5 |
| MSG decoding indicator 4 | 1 |
| grant indicator 4 | 1 |
| Received code index 5 | 5 |
| MSG decoding indicator 5 | 1 |
| grant indicator 5 | 1 |
| Received code index 6 | 5 |
| MSG decoding indicator 6 | 1 |
| grant indicator 6 | 1 |
| Received code index 7 | 5 |
| MSG decoding indicator 7 | 1 |
| grant indicator 7 | 1 |
| Received code index 8 | 5 |
| MSG decoding indicator 8 | 1 |
| grant indicator 8 | 1 |
| Received code index 9 | 5 |
| MSG decoding indicator 9 | 1 |
| grant indicator 9 | 1 |
| Received code index 10 | 5 |
| MSG decoding indicator 10 | 1 |
| grant indicator 10 | 1 |
| Received code index 11 | 5 |
| MSG decoding indicator 11 | 1 |
| grant indicator 11 | 1 |
| Contents total bit | 85 |
| | |
| A-MAP type | 4 |
| CRC (opportunity index) | 16 |
| A-MAP total bit | 105 |

| field name | bit |
|---|---|
| opportunity # per frame | 2 |
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Contents total bit | 27 |
| | |
| A-MAP type | 4 |
| MCRC | 16 |
| A-MAP total bit | 47 |

Fig. 11

| field name | bit |
|---|---|
| opportunity # per frame | 2 |
| Status indicator | 1 |
| Received code index 1 | 5 |
| MSG decoding indicator 1 | 1 |
| Received code index 2 | 5 |
| MSG decoding indicator 2 | 1 |
| Status indicator | 1 |
| Received code index 1 | 5 |
| MSG decoding indicator 1 | 1 |
| Received code index 2 | 5 |
| MSG decoding indicator 2 | 1 |
| Contents total bit | 28 |
| | |
| A-MAP type | 4 |
| MCRC | 16 |
| A-MAP total bit | 48 |

Fig. 12

| field name | bit |
|---|---|
| opportunity # per frame | 2 |
| Status indicator | 1 |
| Received code index 1 | 5 |
| MSG decoding indicator 1 | 1 |
| Status indicator | 1 |
| Received code index 1 | 5 |
| MSG decoding indicator 1 | 1 |
| Status indicator | 1 |
| Received code index 1 | 5 |
| MSG decoding indicator 1 | 1 |
| Contents total bit | 23 |
|  |  |
| A-MAP type | 4 |
| MCRC | 16 |
| A-MAP total bit | 43 |

Fig. 13

| field name | bit |
|---|---|
| opportunity # per frame | 2 |
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Received code index 5 | 5 |
| MSG decoding indicator 5 | 1 |
| Received code index 6 | 5 |
| MSG decoding indicator 6 | 1 |
| Received code index 7 | 5 |
| MSG decoding indicator 7 | 1 |
| Received code index 8 | 5 |
| MSG decoding indicator 8 | 1 |
| Received code index 9 | 5 |
| MSG decoding indicator 9 | 1 |
| Received code index 10 | 5 |
| MSG decoding indicator 10 | 1 |
| Received code index 11 | 5 |
| MSG decoding indicator 11 | 1 |
| Received code index 12 | 5 |
| MSG decoding indicator 12 | 1 |
| Contents total bit | 75 |
|  |  |
| A-MAP type | 4 |
| MCRC | 16 |
| A-MAP total bit | 95 |

Fig. 14

| field name | bit |
|---|---|
| opportunity # per frame | 2 |
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Received code index 5 | 5 |
| MSG decoding indicator 5 | 1 |
| Received code index 6 | 5 |
| MSG decoding indicator 6 | 1 |
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Received code index 5 | 5 |
| MSG decoding indicator 5 | 1 |
| Received code index 6 | 5 |
| MSG decoding indicator 6 | 1 |
| Contents total bit | 76 |
|  |  |
| A-MAP type | 4 |
| MCRC | 16 |
| A-MAP total bit | 96 |

Fig. 15

| field name | bit |
|---|---|
| opportunity # per frame | 2 |
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Status indicator | 1 |
| Received code index 1 | 5 |
| MSG decoding indicator 1 | 1 |
| Received code index 2 | 5 |
| MSG decoding indicator 2 | 1 |
| Received code index 3 | 5 |
| MSG decoding indicator 3 | 1 |
| Received code index 4 | 5 |
| MSG decoding indicator 4 | 1 |
| Contents total bit | 77 |
| | |
| A-MAP type | 4 |
| MCRC | 16 |
| A-MAP total bit | 97 |

Fig. 16

| field name | bit |
|---|---|
| opportunity # per frame | 2 |
| resource start offset | 7 |
| Status indicator | 1 |
| Received code index 1 | 5 |
| MSG decoding indicator 1 | 1 |
| grant indicator 1 | 1 |
| Received code index 2 | 5 |
| MSG decoding indicator 2 | 1 |
| grant indicator 2 | 1 |
| Received code index 3 | 5 |
| MSG decoding indicator 3 | 1 |
| grant indicator 3 | 1 |
| Contents total bit | 31 |
|  |  |
| A-MAP type | 4 |
| MCRC | 16 |
| A-MAP total bit | 51 |

Fig. 17

| field name | bit |
|---|---|
| opportunity # per frame | 2 |
| resource start offset | 7 |
| Status indicator | 1 |
| Received code index 1 | 5 |
| MSG decoding indicator 1 | 1 |
| grant indicator 1 | 1 |
| Status indicator | 1 |
| Received code index 1 | 5 |
| MSG decoding indicator 1 | 1 |
| grant indicator 1 | 1 |
| Contents total bit | 25 |
|  |  |
| A-MAP type | 4 |
| MCRC | 16 |
| A-MAP total bit | 45 |

Fig. 18

| field name | bit |
|---|---|
| opportunity # per frame | 2 |
| resource start offset | 7 |
| Status indicator | 1 |
| Received code index 1 | 5 |
| MSG decoding indicator 1 | 1 |
| grant indicator 1 | 1 |
| Received code index 2 | 5 |
| MSG decoding indicator 2 | 1 |
| grant indicator 2 | 1 |
| Received code index 3 | 5 |
| MSG decoding indicator 3 | 1 |
| grant indicator 3 | 1 |
| Received code index 4 | 5 |
| MSG decoding indicator 4 | 1 |
| grant indicator 4 | 1 |
| Received code index 5 | 5 |
| MSG decoding indicator 5 | 1 |
| grant indicator 5 | 1 |
| Received code index 6 | 5 |
| MSG decoding indicator 6 | 1 |
| grant indicator 6 | 1 |
| Received code index 7 | 5 |
| MSG decoding indicator 7 | 1 |
| grant indicator 7 | 1 |
| Received code index 8 | 5 |
| MSG decoding indicator 8 | 1 |
| grant indicator 8 | 1 |
| Received code index 9 | 5 |
| MSG decoding indicator 9 | 1 |
| grant indicator 9 | 1 |
| Received code index 10 | 5 |
| MSG decoding indicator 10 | 1 |
| grant indicator 10 | 1 |
| Contents total bit | 80 |
|  |  |
| A-MAP type | 4 |
| MCRC | 16 |
| A-MAP total bit | 100 |

Fig. 19

| field name | bit |
|---|---|
| opportunity # per frame | 2 |
| resource start offset | 7 |
| Status indicator | 1 |
| Received code index 1 | 5 |
| MSG decoding indicator 1 | 1 |
| grant indicator 1 | 1 |
| Received code index 2 | 5 |
| MSG decoding indicator 2 | 1 |
| grant indicator 2 | 1 |
| Received code index 3 | 5 |
| MSG decoding indicator 3 | 1 |
| grant indicator 3 | 1 |
| Received code index 4 | 5 |
| MSG decoding indicator 4 | 1 |
| grant indicator 4 | 1 |
| Received code index 5 | 5 |
| MSG decoding indicator 5 | 1 |
| grant indicator 5 | 1 |
| Status indicator | 1 |
| Received code index 1 | 5 |
| MSG decoding indicator 1 | 1 |
| grant indicator 1 | 1 |
| Received code index 2 | 5 |
| MSG decoding indicator 2 | 1 |
| grant indicator 2 | 1 |
| Received code index 3 | 5 |
| MSG decoding indicator 3 | 1 |
| grant indicator 3 | 1 |
| Received code index 4 | 5 |
| MSG decoding indicator 4 | 1 |
| grant indicator 4 | 1 |
| Received code index 5 | 5 |
| MSG decoding indicator 5 | 1 |
| grant indicator 5 | 1 |
| Contents total bit | 81 |
|  |  |
| A-MAP type | 4 |
| MCRC | 16 |
| A-MAP total bit | 101 |

Fig. 20

| field name | bit |
|---|---|
| opportunity # per frame | 2 |
| resource start offset | 7 |
| Status indicator | 1 |
| Received code index 1 | 5 |
| MSG decoding indicator 1 | 1 |
| grant indicator 1 | 1 |
| Received code index 2 | 5 |
| MSG decoding indicator 2 | 1 |
| grant indicator 2 | 1 |
| Received code index 3 | 5 |
| MSG decoding indicator 3 | 1 |
| grant indicator 3 | 1 |
| Status indicator | 1 |
| Received code index 1 | 5 |
| MSG decoding indicator 1 | 1 |
| grant indicator 1 | 1 |
| Received code index 2 | 5 |
| MSG decoding indicator 2 | 1 |
| grant indicator 2 | 1 |
| Received code index 3 | 5 |
| MSG decoding indicator 3 | 1 |
| grant indicator 3 | 1 |
| Status indicator | 1 |
| Received code index 1 | 5 |
| MSG decoding indicator 1 | 1 |
| grant indicator 1 | 1 |
| Received code index 2 | 5 |
| MSG decoding indicator 2 | 1 |
| grant indicator 2 | 1 |
| Received code index 3 | 5 |
| MSG decoding indicator 3 | 1 |
| grant indicator 3 | 1 |
| Contents total bit | 75 |
|  |  |
| A-MAP type | 4 |
| MCRC | 16 |
| A-MAP total bit | 95 |

Fig. 21

| field name | bit |
|---|---|
| ACK bitmap | N_Slot |
| for (j=0; j< N_Slot, j++) { | - |
| If (ACK bitmap[j] == 1) { | - |
| Number of received codes (L) | [2] [3] [4] |
| For (k=0; k<L; k++) { | - |
| Received code index | 5 |
| MSG decoding indicator | 1 |
| } } } | |
| A-MAP type | 4 |
| MCRC | 16 |

Fig. 22

| field name | bit |
|---|---|
| ACK bitmap | N_Slot |
| Resource start offset | 7 |
| for (j=0; j< N_Slot, j++) { | - |
| If (ACK bitmap [j] == 1) { | - |
| Number of received codes (L) | [2] [3] [4] |
| For (k=0; k<L; k++) { | - |
| Received code index | 5 |
| MSG decoding indicator | 1 |
| Grant indicator | 1 |
| } } } | |
| A-MAP type | 4 |
| MCRC | 16 |

METHOD OF TRANSMITTING AND RECEIVING AN ACKNOWLEDGEMENT IN A WIRELESS SYSTEM

CROSS-REFERENCE TO RELATED APPLICATIONS

This application is the National Stage filing under 35 U.S.C. of International Application No. PCT/KR2010/002296, filed on Apr. 14, 2010, which claims the benefit of earlier filing date and right of priority to Korean Application No. 10-2009-0067775, filed on Jul. 24, 2009 and also claims the benefit of U.S. Provisional Application Ser. Nos. 61/175,060, filed on May 4, 2009, 61/173,217, filed on Apr. 28, 2009, 61/173,155, filed on Apr. 27, 2009, 61/172,790, filed on Apr. 27, 2009, and 61/171,469, filed on Apr. 22, 2009, the contents of which are all incorporated by reference herein in their entirety.

TECHNICAL FIELD

The present invention relates to a wireless communication system, and more particularly, to a method for transmitting and receiving an Acknowledgment (ACK) in a wireless communication system.

BACKGROUND ART

A random access-based UpLink (UL) Bandwidth Request (BR) procedure and raging procedure in a conventional wireless communication system will be described below.

FIG. 1 is a diagram illustrating a signal flow for a UL BR operation in a conventional wireless communication system.

Referring to FIG. 1, a Mobile Station (MS) selects a BR code from a set of BR codes among ranging codes and transmits the selected BR code to a Base Station (BS) in order to request a UL bandwidth in step S110. If the MS fails to be allocated UL resources until expiration of a timer (a contention-based reservation timeout or a value T3) which is activated after the transmission of the BR code, it retransmits the BR code. Upon successful receipt of the BR code from the MS, the BS allocates UL resources to the MS so that the MS may transmit a Bandwidth Request (BW-REQ) message in the allocated UL resources in step S120. In step S130, the MS transmits a BW-REQ message to the BS in the allocated UL resources. Upon receipt of the BW-REQ message from the MS, the BS allocates UL resources to the MS in step S140 and the MS transmits data in the allocated UL resources to the BS in step S150.

FIG. 2 is a diagram illustrating a signal flow for a ranging procedure in the conventional wireless communication system.

Referring to FIG. 2, an MS selects a ranging code from a set of initial ranging codes among ranging codes and transmits the selected ranging code to a BS, for initial ranging in step S210. Upon successful receipt of the ranging code from the MS, the BS allocates UL resources to the MS, for transmission of a Ranging Request (RNG-REQ) message in step S220. According to the time status of the ranging code, the BS may transmit a Ranging Response (RNG-RSP) message to the MS. If the MS fails to be allocated UL resources or to receive an RNG-RSP message from the BS until expiration of a timer (a contention-based reservation timeout or a value T3) which is activated after the transmission of the ranging code, the MS retransmits the ranging code.

When being allocated UL resources for transmission of an RNG-REQ message, the MS transmits the RNG-REQ message in the allocated UL resources to the BS in step S230 and the BS replies to the MS with an RNG-RSP message in step S240. Besides initial ranging, there are handover ranging and periodic ranging.

A random access-based UL BR procedure and ranging procedure in a future broadband wireless access system will be described below.

FIG. 3 is a diagram illustrating a signal flow for a UL BR procedure in a future broadband wireless access system.

In the future-generation wireless communication system, a BS supports both a 5-step regular BR procedure and a 3-step quick access BR procedure. The 5-step regular BR procedure may be performed independently of the 3-step quick access BR procedure or as a fallback mode of the 3-step quick access BR procedure.

Referring to FIG. 3, in the 3-step quick access BR procedure, an MS transmits a BR indicator that is selected randomly or according to a predetermined rule and a quick access message including UL BR information to a BS in step S310. The BR indicator may be a BR sequence or a BR code, and the UL BR information may include a Station Identifier (STID), a request size, etc.

The BS transmits an ACK/Negative ACK (ACK/NACK) for the BR indicator to the MS in step S320. Upon successful receipt of the BR indicator and the quick access message, the BS allocates UL resources for data transmission to the MS in step S360 and the MS transmits data in the allocated UL resources to the BS in step S370. The MS may transmit additional UL BR information along with the data in step S370.

In the 5-step regular BR procedure, the MS transmits a randomly selected BR indicator to the BS in step S310. The BS transmits an ACK/NACK for the BR indicator to the MS in step S320 and allocates UL resources to the MS by a Code Division Multiple Access (CDMA) allocation Advanced-MAP (A-MAP) Information Element (IE) so that the MS may transmit a BW-REQ message in the allocated UL resources in step S330.

In step S340, the MS transmits a BW-REQ message in the allocated UL resources to the BS. The BS then allocates UL resources to the MS by a UL basic assignment A-MAP IE in step S360 and the MS transmits data in the allocated UL resources to the BS in step S370. The MS may transmit additional UL BR information along with the data in step S370.

FIG. 4 is a diagram illustrating a signal flow for a ranging procedure in the future broadband wireless access system.

Referring to FIG. 4, an MS transmits a ranging indicator to a BS in step S410 and the BS transmits an ACK/NACK for the ranging indicator to the MS in step S420. In step S430, the BS then allocates UL resources for transmission of an RNG-REQ message to the MS. The MS transmits an RNG-REQ message to the BS in step S440 and the BS replies to the MS with an RNG-RSP message in step S450.

As described above, upon receipt of a random access code such as a BR indicator or a ranging indicator from an MS, a BS transmits an ACK/NACK for the random access code to the MS in the broadband wireless access system. Accordingly, there exists a need for minimizing the overhead of ACK/NACK transmission.

DISCLOSURE OF INVENTION

Technical Problem

As described above, there exists a need for a method for transmitting and receiving an Acknowledgment (ACK) that minimizes the overhead of ACK for a random access code received from a Mobile Station (MS) in a broadband wireless access system.

Accordingly, the present invention is directed to a method for transmitting and receiving an ACK for a random access code received from a Mobile Station (MS) in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method for receiving an ACKnowledgment (ACK) at a Mobile Station (MS) in a wireless communication system includes transmitting a bandwidth request indicator to a Base Station (BS); and receiving an ACK for the transmitted bandwidth request indicator from the BS, the ACK including an extended A-MAP Type field, wherein the extended A-MAP Type field indicates a format of the ACK.

In another aspect of the present invention, a method for transmitting an ACKnowledgment (ACK) at a Base Station (BS) in a wireless communication system includes receiving a bandwidth request indicator from a Mobile Station (MS); and transmitting an ACK for the bandwidth request indicator to the MS, the ACK including an extended A-MAP Type field, wherein the extended A-MAP Type field indicates a format of the ACK.

The format of the ACK includes first ACK format, wherein an ACK whose format is the first ACK format includes a number of received codes field indicating a number of codes which the BS decodes successfully.

The format of the ACK includes second ACK format, wherein an ACK whose format is the second ACK format includes the number of received codes field and a resource start offset field indicating an index of a start resource unit of resource which the BS allocates to the MS through the ACK.

The format of the ACK includes third ACK format, wherein an ACK whose format is the third ACK format includes an opportunity index field indicating which transmission opportunity the ACK is for.

The format of the ACK includes forth ACK format, wherein an ACK whose format is the forth ACK format includes the opportunity index field and the resource start offset field.

Advantageous Effects of Invention

According to the embodiments of the present invention, it is possible to minimize overhead of an ACK by selecting a ACK format according to status of a base station.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6 and 7 illustrate ACK format of case that an ACK is transmitted in a transmission opportunity unit and resource is not allocated through an ACK.

FIGS. 8 and 9 illustrate ACK format of case that an ACK is transmitted in a transmission opportunity unit and resource is allocated through an ACK.

FIG. 10 illustrates an ACK when resource is not allocated through an ACK, a frame includes a transmission opportunity and a length of A-MAP IE is short.

FIG. 11 illustrates an ACK when resource is not allocated through an ACK, a frame includes two transmission opportunities and a length of A-MAP IE is short.

FIG. 12 illustrates an ACK when resource is not allocated through an ACK, a frame includes three transmission opportunities and a length of A-MAP IE is short.

FIG. 13 illustrates an ACK when resource is not allocated through an ACK, a frame includes a transmission opportunity and a length of A-MAP IE is long.

FIG. 14 illustrates an ACK when resource is not allocated through an ACK, a frame includes two transmission opportunities and a length of A-MAP IE is long.

FIG. 15 illustrates an ACK when resource is not allocated through an ACK, a frame includes three transmission opportunities and a length of A-MAP IE is long.

FIG. 16 illustrates an ACK when resource is allocated through an ACK, a frame includes a transmission opportunity and a length of A-MAP IE is short.

FIG. 17 illustrates an ACK when resource is allocated through an ACK, a frame includes two transmission opportunities and a length of A-MAP IE is short.

FIG. 18 illustrates an ACK when resource is allocated through an ACK, a frame includes a transmission opportunity and a length of A-MAP IE is long.

FIG. 19 illustrates an ACK when resource is allocated through an ACK, a frame includes two transmission opportunities and a length of A-MAP IE is long.

FIG. 20 illustrates an ACK when resource is allocated through an ACK, a frame includes three transmission opportunities and a length of A-MAP IE is long.

FIG. 21 illustrates second ACK format when resource is not allocated through an ACK.

FIG. 22 illustrates second ACK format when resource is allocated through an ACK

BEST MODE FOR CARRYING OUT THE INVENTION

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the following description of the present invention, a detailed description of known functions and configurations incorporated herein will be omitted when it may obscure the subject matter of the present invention. The same reference numbers will be used throughout this specification to refer to the same or like parts.

Through the specification, when it is said that some part "includes" a specific element, this means that the part may further include other elements, not excluding them, unless otherwise mentioned. The term "-er(or)", "module", "portion" or "part" is used to signify a unit of performing at least one function or operation. The unit can be realized in hardware, software, or in combination of both.

With reference to FIGS. 5 to 22 a description will be made of a method for transmitting an ACKnowledgment (ACK) in a wireless communication system according to an exemplary embodiment of the present invention.

The exemplary embodiment of the present invention proposes three ACK formats for minimizing the overhead of an ACK(acknowledgement) for random access code. While a random access code is described in the context of a Bandwidth Request (BR) indicator or a ranging indicator, it is to be understood that the present invention is not limited to a BR indicator and a ranging indicator.

Figure 1:
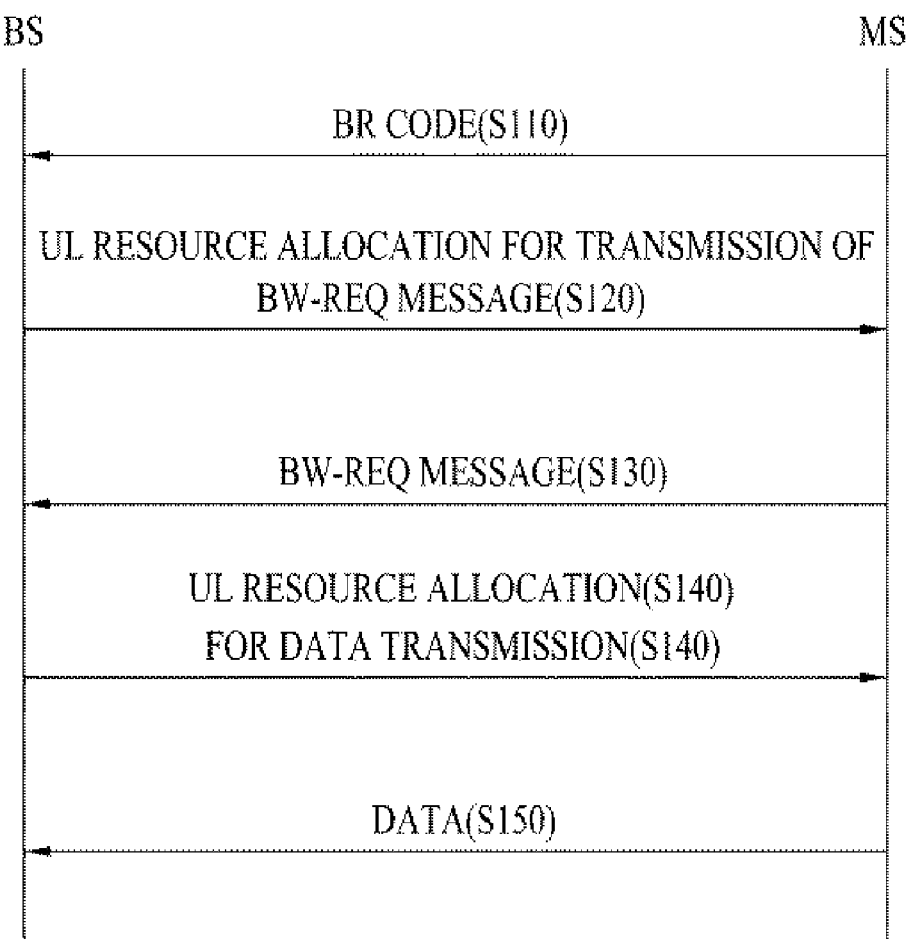
FIG. 1 is a diagram illustrating a signal flow for a UL BR operation in a conventional wireless communication system.
Figure 2:
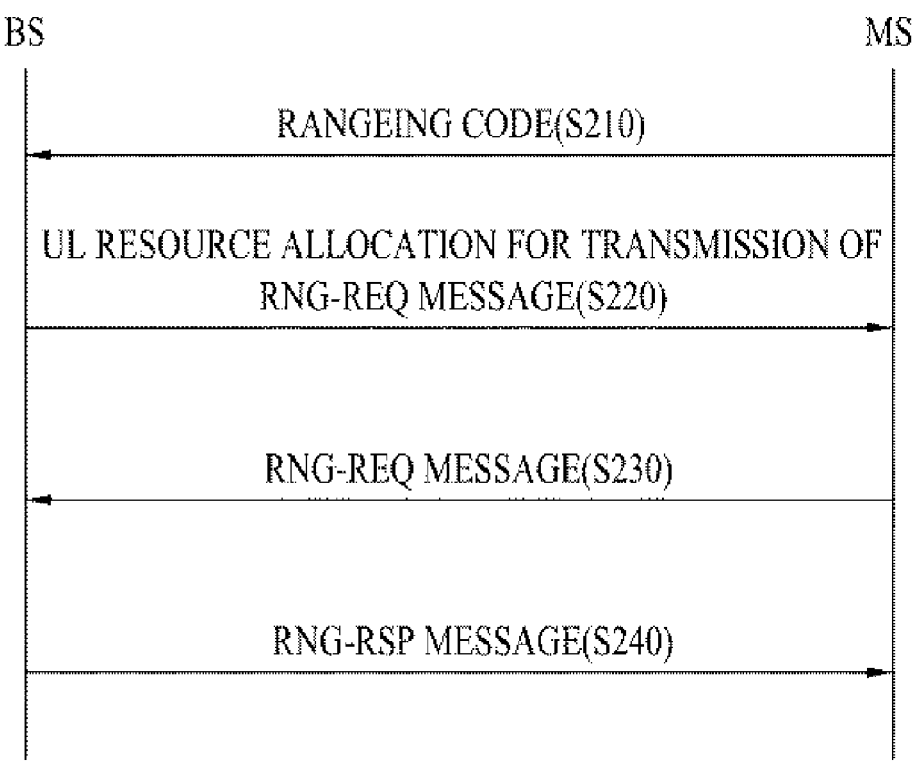
FIG. 2 is a diagram illustrating a signal flow for a ranging procedure in the conventional wireless communication system.
Figure 3:
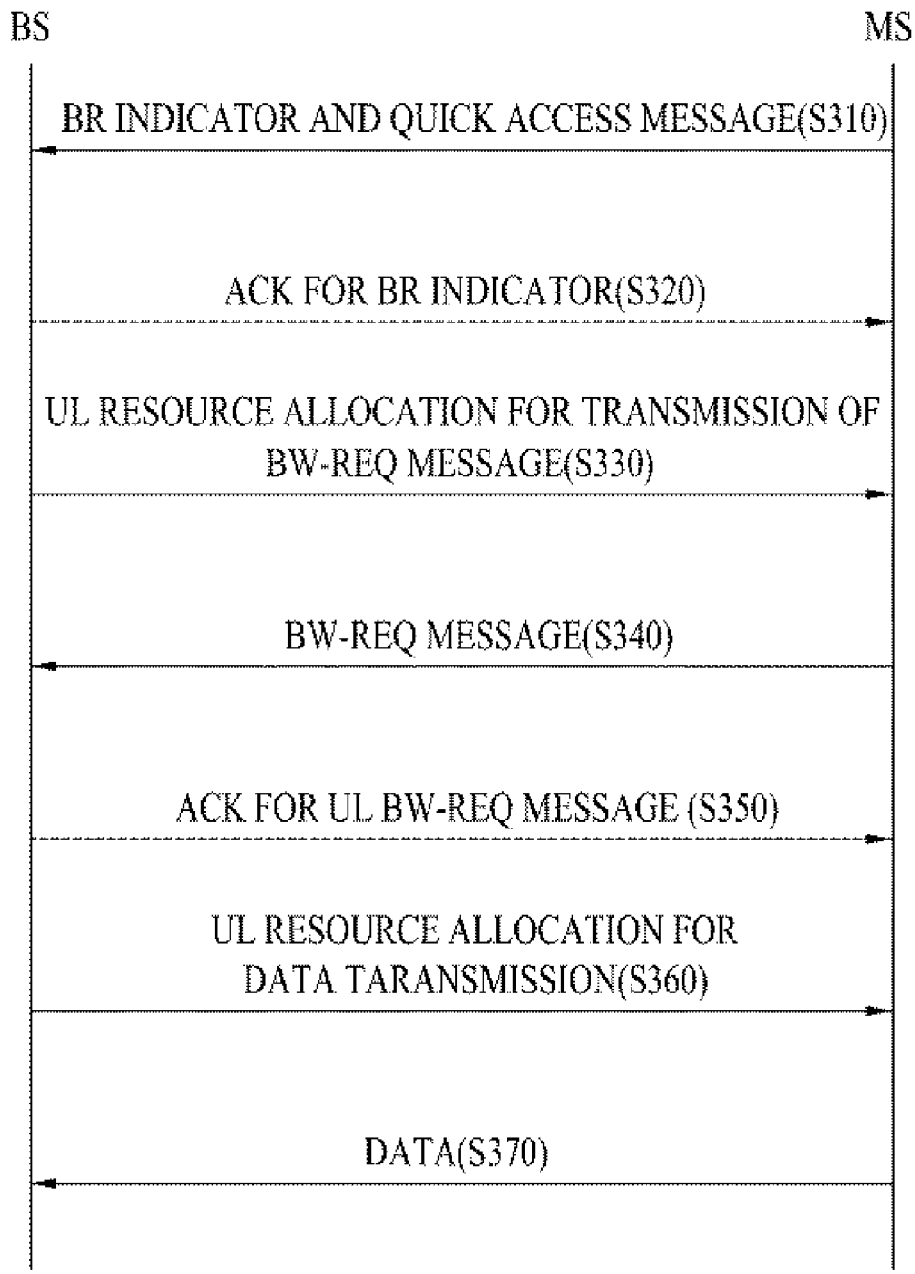
FIG. 3 is a diagram illustrating a signal flow for a UL BR procedure in a future broadband wireless access system.
Figure 4:
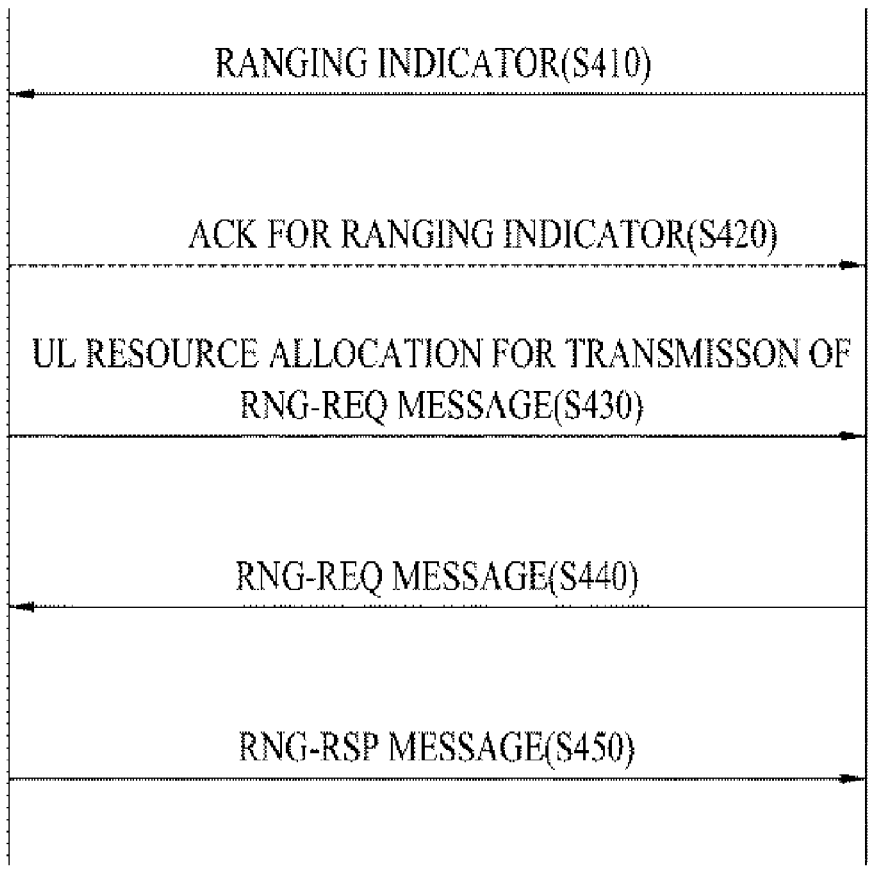
FIG. 4 is a diagram illustrating a signal flow for a ranging procedure in the future broadband wireless access system.
Figure 5:
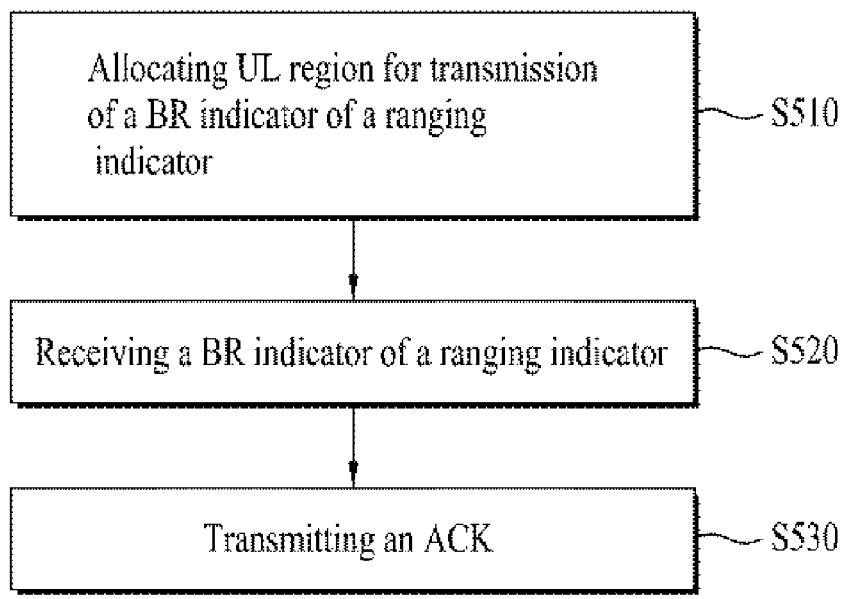
FIG. 5 is a flowchart illustrating a method for transmitting an ACK in a wireless communication system according to an exemplary embodiment of the present invention.

FIG. 5 is a flowchart illustrating a method for transmitting an ACK in a wireless communication system according to an exemplary embodiment of the present invention.

Referring to FIG. 5, a Base Station (BS) allocates an UpLink (UL) region for transmission of a BR indicator or a UL region for transmission of a ranging indicator to a Mobile Station (MS) in step S510 and receives a BR indicator or a ranging indicator in the allocated UL region in step S520.

The UL region for transmission of a BR indicator is defined separately from a UL region for transmission of a ranging indicator and each of the UL regions includes one or more transmission opportunities. A transmission opportunity is a resource region including one or more resource units, carrying a BR indicator or a ranging indicator. Transmission opportunities may be indexed.

Thus the MS transmits the BR indicator or the ranging indicator through a transmission opportunity to the BS.

In step S530, the BS transmits an ACK for the BR indicator or the ranging indicator to the MS.

The format of an ACK for a BR indicator is different from the format an ACK for a ranging indicator because the ACKs may have different field configurations. Another reason for the different ACK formats is that even the same fields in the ACKs may have different bit sizes since different numbers of codes and different numbers of transmission opportunities are available to the BR indicator and the ranging indicator.

In the exemplary embodiment of the present invention, three ACK formats for a BR indicator are proposed.

First ACK format will be explained referring to FIGS. 6 to 20.

First ACK format includes an ACK format of a case that an ACK is transmitted in a transmission opportunity unit and an ACK format of a case that an ACK is transmitted in a frame unit. And an ACK format of a case that resource is allocated to a MS through an ACK and an ACK format of a case that resource is not allocated to a MS through an ACK are proposed.

An ACK, whose format is the first ACK format, does not include information of the number of received codes, and a MS can implicitly figures out the number of codes a BS received.

When ACK is transmitted in a transmission opportunity unit, an ACK includes a response for a random access code unit which a BS received at a transmission opportunity. Thus, maximum number of ACKs in x+n frame or x+n subframe is number of transmission opportunities in x frame or x subframe. Here, x is ACK delay.

FIGS. 6 and 7 illustrate ACK format of case that an ACK is transmitted in a transmission opportunity unit and resource is not allocated through an ACK.

As described in FIGS. 6 and 7, ACK format of case that an ACK is transmitted in a transmission opportunity unit and resource is not allocated through an ACK includes a status indicator field, received code index fields and MSG decoding indicator fields.

The status indicator field indicates whether a BR indicator is received successfully at a transmission opportunity. The status indicator field is set to 1 when one or more BR indicators are received at the transmission opportunity, and the status indicator field is set to 0 when BR indicator is not received at the transmission opportunity.

The received code index field indicates a code index of a BR indicator received at the transmission opportunity.

The MSG decoding indicator field indicating whether a MS decodes successfully a quick access massage transmitted with a BR indicator.

A MCRC (masked cyclic redundancy check) is a CRC (cyclic redundancy check) masked with a reserved station ID. A MCRC can masked with a station ID reserved for the transmission opportunity and a MS can acquire an index of the transmission opportunity through MCRC. If the index of transmission opportunity is not transmitted, ACK includes an index field.

FIGS. 6 and 7 illustrate ACK formats of cases that length of A-MAP IE are forties, fifties, nineties and hundreds. A format of an ACK can be decided by a length of A-MAP IE. For example, a format of an ACK can be decided as two formats. FIG. 6 shows a short A-MAP IE based ACK format and FIG. 7 shows a long A-MAP IE based ACK format. A number of codes each of short ACK and long ACK can include is decided by a length of A-MAP IE, and a format of an ACK is decided by the number of codes.

FIG. 6(a) illustrates a format of a short ACK including 4 codes, and FIG. 6(b) illustrates a format of a short ACK including 5 codes, and FIG. 6(c) illustrates a format of a short ACK including 6 codes.

FIG. 7(a) illustrates a format of a long ACK including 12 codes, and FIG. 7(b) illustrates a format of a long ACK including 13 codes, and FIG. 7(c) illustrates a format of a long ACK including 14 codes.

For example, if a length of short A-MAP IE is 56 bits and a length of long A-MAP IE is 100 bits, ACK formats of FIGS. 6(b) and 7(b) are used and remain bits are padded.

If formats of a short ACK and a long ACK are decided by lengths of A-MAP IEs, a BS selects the short ACK or the long ACK according to number of codes detected at a transmission opportunity and transmits the selected ACK. For example, when ACK formats of FIGS. 6(b) and 7(b) are used, a BS selects an ACK format of FIG. 6(b) if number of codes detected is 3, and a BS selects a ACK format of FIG. 7(b) if number of codes detected is 9. And, a BS selects ACK formats of FIG. 6(b) and FIG. 7(b) if number of codes detected is 17.

After selecting short or long ACK according number of codes detected, a BS fills received code index fields and MSG decoding indicator fields as many as number of codes detected and fills remain fields with 0. Here, received code index fields are filled as ascending order.

For example, when a BS detects code index 0 and 3 and successfully decodes a quick access massage received with 0, 3, a BS selects the ACK format of FIG. 6(b) and sets status indicator field as 1, received code index 1 field as 0, MSG decoding indicator 1 field as 1, received code index 2 field as 3, MSG decoding indicator 2 field as 1, remain fields as 0.

If a MS receives an ACK, the MS checks MCRC. If MCRC is marked with a station ID reserved for a transmission opportunity at which the MS transmits a code, the MS checks remain fields. If a state indicator field is set as 1, the MS judges that a BS decodes one or more codes at the transmission opportunity and checks received code index fields and MSG decoding indicator fields to check whether the BS decoded code the MS transmitted.

FIGS. 8 and 9 illustrate ACK format of case that an ACK is transmitted in a transmission opportunity unit and resource is allocated through an ACK.

As described in FIGS. 8 and 9, ACK format of case that an ACK is transmitted in a transmission opportunity unit and resource is allocated through an ACK includes a status indicator field, a resource start offset field, received code index fields, MSG decoding indicator fields and grant indicators.

The resource start offset field indicates an index of a start resource unit of resource which the BS allocates to MSs through the ACK. Through the ACK, a BS can allocates resource to all or part of MSs which transmitted BR indicators the BS received successfully. When the BS allocates resource through the ACK, a grant indicator field is set to 1. Thus, the BS allocates resource from a start point which a resource start offset field indicates to MSs whose grant indicator field is set to 1.

The grant indicator field indicates whether resource is allocated to a MS through an ACK. When resource is allocated through an ACK, the grant indicator field is set to 1. And when resource is not allocated through an ACK, the grant indicator field is set to 0.

FIG. 8(a) illustrates a format of a short ACK including 3 codes, and FIG. 8(b) illustrates a format of a short ACK including 4 codes, and FIG. 8(c) illustrates a format of a short ACK including 5 codes.

FIG. 9(a) illustrates a format of a long ACK including 9 codes, and FIG. 9(b) illustrates a format of a long ACK including 10 codes, and FIG. 9(c) illustrates a format of a long ACK including 11 codes.

For example, if a length of short A-MAP IE is 56 bits and a length of long A-MAP IE is 100 bits, ACK formats of FIGS. 8(b) and 9(b) are used. If formats of a short ACK and a long ACK are decided by lengths of A-MAP IEs, a BS selects the short ACK or the long ACK according to number of codes detected.

For example, when ACK formats of FIGS. 8(b) and 9(b) are used, a BS selects an ACK format of FIG. 8(b) if number of codes detected is 3. And a BS selects a ACK format of FIG. 9(b) if number of codes detected is 9.

If a BS detects one or more codes in a transmission opportunity, it set the status indicator field to 1 and a BS fills received code index fields MSG decoding indicator fields and grant indicator fields as many as number of codes detected and fills remain fields with 0. Here, received code index fields are filled as ascending order.

For example, when a BS detects code index 0 and successfully decodes a quick access massage received with 0 and allocates resource through an ACK, a BS sets a status indicator field as 1, received code index 1 field as 0, a MSG decoding indicator 1 field as 1, a grant indicator field as 1 and a resource start offset field as an index of a start resource unit of resource which the BS allocates to the MS through the ACK.

If a MS receives an ACK, the MS checks MCRC. If MCRC is marked with a station ID reserved for a transmission opportunity at which the MS transmits a code, the MS checks remain fields. If a state indicator field is set as 1, the MS judges that a BS decodes one or more codes at the transmission opportunity and checks received code index fields and MSG decoding indicator fields to check whether the BS decoded code the MS transmitted.

Next, ACK formats of cases that resource is allocated and is not allocated through an ACK when an ACK is transmitted in a frame unit.

FIGS. 10 to 15 illustrate ACK format of case that an ACK is transmitted in a frame unit and resource is not allocated through an ACK. And FIGS. 16 to 21 illustrate ACK format of case that an ACK is transmitted in a frame unit and resource is allocated through an ACK.

As described in FIGS. 10 to 15, ACK format of case that an ACK is transmitted in a frame unit and resource is not allocated through an ACK includes an opportunity number per frame field, a status indicator field, received code index fields and MSG decoding indicator fields.

The opportunity number per frame field indicates number of transmission opportunity included in a frame.

As described in FIGS. 16 to 20, ACK format of case that an ACK is transmitted in a frame unit and resource is allocated through an ACK includes an opportunity number per frame field, a resource start offset field, a status indicator field, received code index fields, MSG decoding indicator fields and grant indicator fields.

When an ACK is transmitted in a frame unit, a format of an ACK is decided by number of transmission opportunity included in a frame and length of A-MAP IE.

FIG. 10 illustrates an ACK when resource is not allocated through an ACK, a frame includes a transmission opportunity and a length of A-MAP IE is short. FIG. 11 illustrates an ACK when resource is not allocated through an ACK, a frame includes two transmission opportunities and a length of A-MAP IE is short. FIG. 12 illustrates an ACK when resource is not allocated through an ACK, a frame includes three transmission opportunities and a length of A-MAP IE is short.

FIG. 13 illustrates an ACK when resource is not allocated through an ACK, a frame includes a transmission opportunity and a length of A-MAP IE is long. FIG. 14 illustrates an ACK when resource is not allocated through an ACK, a frame includes two transmission opportunities and a length of A-MAP IE is long. FIG. 15 illustrates an ACK when resource is not allocated through an ACK, a frame includes three transmission opportunities and a length of A-MAP IE is long.

FIG. 16 illustrates an ACK when resource is allocated through an ACK, a frame includes a transmission opportunity and a length of A-MAP IE is short. FIG. 17 illustrates an ACK when resource is allocated through an ACK, a frame includes two transmission opportunities and a length of A-MAP IE is short.

FIG. 18 illustrates an ACK when resource is allocated through an ACK, a frame includes a transmission opportunity and a length of A-MAP IE is long. FIG. 19 illustrates an ACK when resource is allocated through an ACK, a frame includes two transmission opportunities and a length of A-MAP IE is long. FIG. 20 illustrates an ACK when resource is allocated through an ACK, a frame includes three transmission opportunities and a length of A-MAP IE is long.

A BS selects an ACK format according to number of transmission opportunity in a frame, number of codes decoded successfully.

For example, a BS transmits an ACK whose format is a format of FIG. 14 when resource is not allocated through an ACK, and number of transmission opportunities in a frame is 2, and number of codes detected in first transmission opportunity is 3, and number of codes detected in second transmission opportunity is 5.

Next, second ACK format will be explained referring to FIGS. 21 and 22.

FIG. 21 illustrates second ACK format when resource is not allocated through an ACK. FIG. 22 illustrates second ACK format when resource is allocated through an ACK According to an exemplary embodiment of the present invention, an ACK of second format can be transmitted in frame or subframe unit and includes number of received codes.

As described in FIG. 21, when resource is not allocated through an ACK, ACK of second ACK format includes an ACK bitmap field, a number of received codes field, received code index fields, MSG decoding indicator fields.

The ACK bitmap field indicates whether a BS receives BR indicators successfully in each of transmission opportunities of a frame or a subframe. Thus, size of the ACK bitmap field is number of transmission opportunities of a frame or a subframe (N_Slot).

Instead of an ACK bitmap field, an opportunity index field and a status indicator field can be included in an ACK.

The opportunity index field indicates index of each transmission opportunity in frame or subframe, and a status indicator field indicates whether BR indicator is received successfully at each transmission opportunity. That is, each status indicator field is for each opportunity index field. And, a status indicator field is set to 1 if a BS received one of more BR indicators at a transmission opportunity of corresponding opportunity index field, and is set to 1 otherwise.

The number of received codes field indicates number of BR indicators which a BS decoded successfully at a transmission opportunity.

As described in FIG. 22, when resource is allocated through an ACK, ACK of second ACK format includes an ACK bitmap field, a resource start offset field, a number of received codes field, received code index fields, MSG decoding indicator fields and a grant indicator field.

Next, third ACK format will be explained.

Table 1 below illustrates third ACK format according to an exemplary embodiment of the present invention.

TABLE 1

| Syntax | Size (bits) | Notes |
|---|---|---|
| ACK A-MAP IE( ) { | — | — |
| A-MAP Type | 4 | ACK A-MAP IE |
| Extended A-MAP Type | 2 | 0b00: Type I, 0b01: Type II, 0b10: Type III, 0b11: Type IV |
| If (Extended A-MAP Type == 00) { | | |
| ACK Bitmap | N_Slots | Each bit indicates the decoding status of code in the corresponding opportunity. |
| | | 0b0: No code is detected, 0b1: At least one code is detected. |
| For (i=0; N_Slots; i++) { | | |
| If (ACK Bitmap[i] == 1) { | | |
| Extended ACK A-MAP | 1 | To indicate whether additional ACK A-MAP IE (Type III or Type IV) for the opportunity is transmitted or not. |
| | | 0b0: All of the received code indices are included in this ACK A-MAP IE. |
| | | 0b1: A part of the received code indices are included in this ACK A-MAP IE. |
| Number of Received codes (L) | 5 | The number of code indices included in this ACK A-MAP IE. |
| For (j=0; j<L; j++) { | | |
| Code index | 5 | Code index received in the opportunity |
| MSG decoding indicator | 1 | To indicate the decoding status of quick access message |
| }}}} | | |
| If (Extended A-MAP Type == 01) { | | |
| ACK Bitmap | N_Slots | Each bit indicates the decoding status of code in the corresponding opportunity. |
| | | 0b0: No code is detected, 0b1: At least one code is detected. |
| Resource start offset | TBD | |
| For (i=0; N_Slots; i++) { | | |
| If (ACK Bitmap[i] == 1) { | | |
| Extended ACK A-MAP | 1 | To indicate whether additional ACK A-MAP IE (Type III or Type IV) for the opportunity is transmitted or not. |
| | | 0b0: All of the received code indices are included in this ACK A-MAP IE. |
| | | 0b1: A part of the received code indices are included in this ACK A-MAP IE. |
| Number of Received codes (L) | 5 | The number of code indices included in this ACK A-MAP IE. |
| For (j=0; j<L; j++) { | | |
| Code index | 5 | Code index received in the opportunity |
| MSG decoding indicator | 1 | To indicate the decoding status of quick access message |
| Grant indicator | 1 | To indicate whether grant for the code index is included or not |
| | | 0b0: No grant, 0b1: Grant. |
| }}}} | | |
| If (Extended A-MAP Type == 10) { | | |
| Opportunity Index | TBD | Index of opportunity in the previous UL frame |
| Status indicator | 1 | To indicate the decoding status of the specific opportunity in the previous UL frame. |
| | | 0b0: No code is detected, 0b1: At least one code is detected. |
| Code index 1 | 5 | Code index received in the opportunity |
| MSG decoding indicator 1 | 1 | To indicate the decoding status of quick access message |
| Code index 2 | 5 | Code index received in the opportunity |
| MSG decoding indicator 2 | 1 | To indicate the decoding status of quick access message |
| ...... | | |

TABLE 1-continued

| Syntax | Size (bits) | Notes |
| --- | --- | --- |
| Code index n | 5 | Code index received in the opportunity |
| MSG decoding indicator n | 1 | To indicate the decoding status of quick access message |
| } | | |
| If (Extended A-MAP Type == 11) { | | |
| Opportunity Index | TBD | Index of opportunity in the previous UL frame |
| Status indicator | 1 | To indicate the decoding status of the specific opportunity in the previous UL frame. |
| | | 0b0: No code is detected, 0b1: At least one code is detected. |
| Resource start offset | TBD | |
| Code index 1 | 5 | Code index received in the opportunity |
| MSG decoding indicator 1 | 1 | To indicate the decoding status of quick access message |
| Grant indicator 1 | 1 | To indicate whether grant for the code index is included or not |
| | | 0b0: No grant, 0b1: Grant. |
| ...... | | |
| Code index m | 5 | Code index received in the opportunity |
| MSG decoding indicator m | 1 | To indicate the decoding status of quick access message |
| Grant indicator m | 1 | To indicate whether grant for the code index is included or not |
| } | | |
| MCRC | 16 | CRC masked by the reserved STID for ACK A-MAP |
| } | | |

Referring to Table 1, an ACK of third ACK format includes an extended A-MAP Type field, and format of ACK is decided by a value of the extended A-MAP Type field.

Table 2 illustrates formats of ACK according to values of the extended A-MAP Type field.

TABLE 2

| Extended A-MAP Type | Description |
| --- | --- |
| 0b00 | Second ACK format when resource is not allocated through an ACK (Type 1) |
| 0b01 | Second ACK format when resource is allocated through an ACK (Type 2) |
| 0b10 | First ACK format when resource is not allocated through an ACK (Type 3) |
| 0b11 | First ACK format when resource is allocated through an ACK (Type 4) |

As described in table 1 and 2, if an extended A-MAP Type field is 0b00, format of corresponding ACK is second ACK format when resource is not allocated through an ACK. If an extended A-MAP Type field is 0b01, format of corresponding ACK is second ACK format when resource is allocated through an ACK. If an extended A-MAP Type field is 0b10, format of corresponding ACK is first ACK format when resource is not allocated through an ACK. If an extended A-MAP Type field is 0b11, format of corresponding ACK is first ACK format when resource is allocated through an ACK.

An ACK whose extended A-MAP Type field is 0b00 is called as Type 1, an ACK whose extended A-MAP Type field is 0b01 is called as Type 2, an ACK whose extended A-MAP Type field is 0b10 is called as Type 3, and an ACK whose extended A-MAP Type field is 0b11 is called as Type 4.

That is, a BS can select an ACK format and inform a MS of the selected ACK format through an extended A-MAP Type field.

If Type 1 or Type 2 ACK can not include all information, after transmitting Type 1 or Type 2 ACK, a BS can transmit Type 3 of Type 4 ACK additionally. Or, a BS can transmit Type 3 of Type 4 ACK independently.

A method of receiving an ACK according to the exemplary embodiment of the present invention will be described.

A MS is allocated uplink region for transmission of a BR indicator or a ranging indicator by a BS, and transmits a BR indicator or a ranging indicator through the uplink region to the BS. Then, the MS receives an ACK for the BR indicator or the ranging indicator form the BS.

Table 3 illustrates operations of a MS for 8 cases when the MS receives an ACK of third ACK format.

TABLE 3

| Case | Type I or II | Type III or IV | AMS operation |
| --- | --- | --- | --- |
| 1 | Not decodable(Extended ACK A-MAP == 0) | Not transmitted | Implicit ACK |
| 2 | Decodable(Extended ACK A-MAP == 0) | Not transmitted | Explicit ACK |
| 3 | Not decodable(Extended ACK A-MAP == 1) | Not decodable | Implicit ACK |
| 4 | Not decodable(Extended ACK A-MAP == 1) | Decodable | 1) Explicit ACK 2) Explicit ACK for code indices in Type III or IV and Implicit ACK for other code indices |
| 5 | Decodable(Extended ACK A-MAP == 1) | Not decodable | 1) Explicit ACK for code indices in Type I or II and Implicit ACK for other code indices 2) Implicit ACK |
| 6 | Decodable(Extended ACK A-MAP == 1) | Decodable | Explicit ACK |
| 7 | Not transmitted | Not decodable | Implicit ACK |
| 8 | Not transmitted | Decodable | 1) Explicit ACK 2) Explicit ACK for code indices in Type III or IV and Implicit ACK for other code indices |

In cases 1 and 2, a BS transmits Type 1 or Type 2 ACK whose Extended ACK A-MAP field is 0 and does not transmits Type 3 or Type 4 ACK. An Extended ACK A-MAP field indicates whether an additional ACK exists. If an additional ACK is transmitted because all information can not be included in a present ACK, an Extended ACK A-MAP field of the present ACK is set to 1. If an additional ACK is not transmitted because all information can be included in a present ACK, an Extended ACK A-MAP field of the present ACK is set to 0.

In case 1, a MS could not decode Type 1 or Type 2 ACK so it could not receive any ACK. In this case, a MS implicitly cognizes that a BS received the BR indicator the MS transmitted successfully.

In case 2, because a MS decodes Type 1 or Type 2 ACK successfully, it explicitly cognizes that a BS received the BR indicator successfully if the ACK has information of the BR indicator and it cognizes that a BS could not receive the BR indicator if the ACK does not have information of the BR indicator.

In cases 3 to 6, a BS transmits Type 1 or Type 2 ACK whose an Extended ACK A-MAP field is 1 and Type 3 or Type 4 ACK.

In case 3, a MS could not decode Type 1 or Type 2 ACK and Type 3 or Type 4 ACK. In this case, a MS implicitly cognizes that a BS received the BR indicator the MS transmitted successfully.

In case 4, a MS could not decode Type 1 or Type 2 ACK and decoded Type 3 or Type 4 ACK. In this case, a MS can operate as one method among two methods.

According to first method, a MS judges that random access of the MS is fail if the BR indicator is not in decoded Type 3 or Type 4 ACK. If a value of an ACK A-MAP field is 1, all information can be transmitted through an additional ACK. In this case, because all information is included in Type 3 or Type 4 ACK, a MS operates according to Type 3 or Type 4 ACK.

A BS can transmit Type 3 or Type 4 ACK additionally when Type 1 or Type 2 ACK can not include all information. And a BS can transmit Type 3 or Type 4 ACK independently. In second method, a BS can be restricted to transmit Type 3 or Type 4 ACK only additionally. A MS can be aware that Type 1 or Type 2 ACK did not be decoded when it decodes Type 3 of Type 4 ACK.

In case 5, a MS decode Type 1 or Type 2 ACK and can not decode Type 3 or Type 4. In this case, a MS can operate as one method among two methods.

According to first method, a MS check whether the BR indicator is in Type 1 or Type 2 ACK. When an extended ACK A-MAP field exist in every transmission opportunity, if the BR indicator in not in an ACK and a value of an extended ACK A-MAP field corresponding to the transmission opportunity is 1, a MS implicitly cognizes that a BS received the BR indicator successfully. When an extended ACK A-MAP field exist in an ACK, a MS implicitly cognizes that a BS received the BR indicator successfully if the BR indicator in not in an ACK.

When a value of an extended ACK A-MAP field of Type 1 or Type 2 ACK is 1 and all information is transmitted in additionally transmitted Type 3 or Type 4 ACK, a MS cognizes ACK implicitly.

In case 6, a MS decodes all of Type 1 or Type 2 ACK and Type 3 or Type 4 ACK. In this case, a MS judges that random access is failed if the BR indicator is not in all of Type 1 or Type 2 ACK and Type 3 or Type 4 ACK.

In case 7, a BS transmits Type 3 or Type 4 ACK independently.

As is apparent from the above description, the overhead of an ACK can be minimized by optimizing fields of the ACK according to the exemplary embodiments of the present invention.

The exemplary embodiments of the present invention may be achieved by various means, for example, hardware, firmware, software, or a combination thereof. In a hardware configuration, the methods for transmitting control information in a wireless communication system according to the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods for updating a location in a wireless communication system according to the embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

It is obvious to those skilled in the art that claims that are not explicitly cited in each other in the appended claims may be presented in combination as an exemplary embodiment of the present invention or included as a new claim by a subsequent amendment after the application is filed.

The invention claimed is:

1. A method for receiving an ACKnowledgment (ACK) at a Mobile Station (MS) in a wireless communication system, the method comprising:
   transmitting a bandwidth request indicator to a Base Station (BS); and
   receiving an ACK for the transmitted bandwidth request indicator from the BS, the ACK including an extended advanced MAP (A-MAP) Type field,
   wherein the extended A-MAP Type field indicates a format of the ACK,
   wherein the format of the ACK includes a first ACK format, and
   wherein an ACK having the first ACK format includes a number of received codes field indicating a number of codes which the BS has decoded successfully.

2. The method according to claim 1,
   wherein the format of the ACK includes a second ACK format, and
   wherein an ACK having the second ACK format includes the number of received codes field and a resource start offset field indicating an index of a start resource unit of resource which the BS allocates to the MS through the ACK.

3. The method according to claim 2,
   wherein the format of the ACK includes a third ACK format, and
   wherein an ACK having the third ACK format includes an opportunity index field indicating which transmission opportunity the ACK is for.

4. The method according to claim 3,
   wherein the format of the ACK includes a fourth ACK format, and
   wherein an ACK having the fourth ACK format includes the opportunity index field and the resource start offset field.

5. The method according to claim 4, further comprising:
   implicitly recognizing that the BS received the bandwidth request indicator successfully if the MS received an ACK having the third or fourth ACK format and did not receive an ACK having the first or second ACK format.

6. A method for transmitting an ACKnowledgment (ACK) at a Base Station (BS) in a wireless communication system, the method comprising:

receiving a bandwidth request indicator from a Mobile Station (MS); and transmitting an ACK for the bandwidth request indicator to the MS, the ACK including an extended advanced MAP (A-MAP) Type field, wherein the extended A-MAP Type field indicates a format of the ACK, wherein the format of the ACK includes a first ACK format, and wherein an ACK having the first ACK format includes a number of received codes field indicating a number of codes which the BS has decoded successfully.

7. The method according to claim 6, wherein the format of the ACK includes a second ACK format, and wherein an ACK having the second ACK format includes the number of received codes field and a resource start offset field indicating an index of a start resource unit of resource which the BS allocates to the MS through the ACK.

8. The method according to claim 7, wherein the format of the ACK includes a third ACK format, and wherein an ACK having the third ACK format includes an opportunity index field indicating which transmission opportunity the ACK is for.

9. The method according to claim 8, wherein the format of the ACK includes a fourth ACK format, and wherein an ACK having the fourth ACK format includes the opportunity index field and the resource start offset field.

10. The method according to claim 9, wherein an ACK having the third or the fourth ACK format is transmitted additionally when an ACK having the first or the second ACK format can not include all necessary information.

* * * * *